United States Patent [19]
Williams et al.

[11] Patent Number: 5,603,411
[45] Date of Patent: *Feb. 18, 1997

[54] METHOD FOR SEPARATING MIXTURE OF FINELY DIVIDED MINERALS

[75] Inventors: Danny L. Williams, Macon; George E. Gantt, Milledgeville; Sanjay Behl; Mitchell J. Willis, both of Macon, all of Ga.

[73] Assignee: Engelhard Corporation, Iselin, N.J.

[*] Notice: The term of this patent shall not extend beyond the expiration date of Pat. No. 5,535,890.

[21] Appl. No.: 596,850

[22] Filed: Feb. 5, 1996

Related U.S. Application Data

[63] Continuation-in-part of Ser. No. 350,913, Dec. 7, 1994, Pat. No. 5,535,890.

[51] Int. Cl.$^6$ ........................................ B03B 1/04
[52] U.S. Cl. ........................ 209/5; 209/10; 106/488
[58] Field of Search .......................... 209/5, 10, 172, 209/172.5, 173; 501/145–148; 106/416, 439, 442, 446, 468, 486, 488

[56] References Cited

U.S. PATENT DOCUMENTS

| | | | |
|---|---|---|---|
| 2,990,958 | 7/1961 | Greane et al. | 209/166 |
| 3,138,550 | 6/1964 | Woolery | 209/5 |
| 3,371,988 | 3/1968 | Maynard et al. | 23/110 |
| 3,701,417 | 10/1972 | Mercade | 209/5 |
| 3,837,482 | 9/1974 | Sheridan, III | 209/5 |
| 3,862,027 | 1/1975 | Mercade | 209/5 |
| 4,334,985 | 6/1982 | Turner, Jr. | 209/5 |
| 4,472,271 | 9/1984 | Bacon, Jr. | 209/167 |
| 4,536,294 | 8/1985 | Guillet et al. | 209/5 |
| 4,604,369 | 8/1986 | Shi | 501/148 |
| 5,145,814 | 9/1992 | Willis | 501/146 |
| 5,342,443 | 8/1994 | Forbus et al. | 106/416 X |
| 5,391,526 | 2/1995 | Willis et al. | 501/146 |

FOREIGN PATENT DOCUMENTS

| 934796 | 8/1963 | United Kingdom | 209/5 |
|---|---|---|---|

OTHER PUBLICATIONS

Flocculation in Biotechnology and Separation Systems, Y. A. Attia, ed, p. 601, Elsevier, Amsterdam, 1987.
Minerals and Metallurgical Processing, B. Behl and B. M. Moudgil, 5, 92, 1992.
Journal of Colloid Interface Science, S. Behl and B. M. Moudgil, 160, 1993.

*Primary Examiner*—Boris Milef
*Attorney, Agent, or Firm*—Inez L. Moselle

[57] ABSTRACT

A selective flocculation process that uses a mixture of dispersants including soda ash to disperse a slimed ore pulp prior to conditioning with a fatty acid, salt and then a polymeric flocculating agent.

18 Claims, No Drawings

METHOD FOR SEPARATING MIXTURE OF FINELY DIVIDED MINERALS

RELATED APPLICATIONS

This is a continuation-in-part of U.S. Ser. No. 08/350,913 filed Dec. 7, 1994, now U.S. Pat. No. 5,535,890.

FIELD OF THE INVENTION

U.S. Ser. No. 08/350,913 relates to a process for separating a mixture of finely divided minerals into constituents thereof. In particular, the invention relates to a procedure for effecting such separation by a novel selective flocculation technique wherein a dispersed aqueous pulp containing the mixture of minerals is preconditioned for selective flocculation with an anionic polymer by addition of both a fatty acid, such as oleic acid, and a source of a polyvalent metal cation, such as calcium chloride. The fatty acid and polyvalent metal cation selectively coat the component of the mixture that is subsequently flocculated with the anionic polymer. An anionic polymer salt dispersant is preferably used in the process. The invention is especially adapted to the separation of colored impurities from kaolin clay.

In accordance with the present invention, the beneficiation response to such process is enhanced by treating the dispersed slurry with soda ash.

BACKGROUND OF THE INVENTION

When particles of mineral ore or powder mixtures are sufficiently large, for example larger than 325 (U.S.)mesh, the components of the mixture can be separated by simple physical means such as air or magnetic separation. When the particles in the mixture are finer, more sophisticated technology may be needed to bring about efficient separations. It is conventional to make the separation of finely divided mineral, e.g., particles finer than 325 mesh (U.S. Sieve), by forming the mixture into an aqueous pulp and adding chemicals that will bring about the desired separation. One widely used procedure is froth flotation. In the case of froth flotation of phosphate or oxidized minerals from siliceous gangue, it is conventional to use a fatty acid collector and a salt promoter. The collector coated minerals particles are separated from gangue in the form of a froth. A frother and aeration are frequently employed. When froth flotation is applied to extremely finely divided (slimed) minerals such as certain kaolin clays, froth flotation of the colored impurities in the clay using a fatty acid collector becomes more difficult and it is necessary to use a clay dispersant to keep the clay particles dispersed during froth flotation. A seminal event in the flotation beneficiation of slimed minerals, especially the flotation of colored titaniferous impurities from fine particle size kaolin, is described in U.S. Pat. No. 2,990,958 Green, et al. This procedure is frequently referred to in the art as ULTRAFLOTATION. ULTRAFLOTATION has been practiced on a vast scale for several decades to upgrade kaolin clays. The process has been extended to the beneficiation of other commercially valuable minerals such as cassiterite (tin oxide), phosphate slime, fluorite and other nonsulfide minerals. Another commercial kaolin flotation process, referred to as TREP, employs calcium chloride and oleic acid. See U.S. Pat. No. 4,472,271, Bacon, et al. In the case of kaolin clays which contain significant amount of slimes, conventional froth flotation techniques may not produce the desired removal of colored bodies.

So-called "selective flocculation" is another procedure that is widely used commercially to separate finely divided minerals and powders. In the case of clay, some procedures utilize anionic polymers to selectively flocculate the clay, leaving the impurities dispersed and amenable to subsequent separation. Commercial variants of selective flocculation employ weakly anionic polymers such as hydrolyzed polyacrylamide to selectively flocculate impurities in the clay, leaving the purified clay dispersed. See, for example, U.S. Pat. No. 3,837,482, Sheridan, U.S. Pat. No. 3,701,417 and U.S. Pat. No. 3,862,027, both Mercade, U.S. Pat. No. 3,371,988, Maynard, et al., and U.S. Pat. No. 4,604,369 (Shi).

Early in the history of froth flotation it was proposed to add an anionic polymeric flocculating agent to a mineral pulp already conditioned with a fatty acid collector. This was followed by froth flotation to bring about the separation. See U.S. Pat. No. 3,138,550, Woolery.

To achieve selective adsorption of a flocculating agent on a particular component of a mixture a number of methods have been suggested in the literature [Yu and Attia; in "Flocculation in Biotechnology and Separation Systems," (Y. A. Attia, ed.), p. 601, Elsevier, Amsterdam, 1987 ; Behl, S. and Moudgil, B. M., *Minerals and Metallurgical Processing*, 5, 92, 1992 and, Behl, S. and Moudgil, B. M., *Journal of Colloid Interface Science*, 160, 1993]. One of the methods involves selectively blocking the active sites on the inert or nonflocculating component for adsorption of the polymeric flocculating agent. This may be achieved by adsorption of a lower molecular weight fraction of the flocculating agent, which can act as a dispersant and/or site blocking agent prior to exposing the particle surfaces to the flocculating agent.

Both froth flotation and selective flocculation have limitations, especially when applied to slimed ores. In the case of froth flotation of kaolin clay in which a significant portion of the material is in the sub-micron size range, even ULTRAFLOTATION may not bring about adequate separation of color bodies in kaolinite to a commercially viable level at an acceptable recovery of purified kaolin. Similar difficulties are experienced when TREP is utilized to beneficiate such ultrafine clay on a commercial scale. On the other hand, selective flocculation processes utilizing anionic polymers generally result in flocs that are very slow to settle unless copious quantities of salt are used to facilitate sedimentation of the flocs. This necessitates costly multiple washing steps because the presence of salt with the clay would adversely affect the rheology of the clay.

SUMMARY OF INVENTION

U.S. Pat. No. 08/350,913 relates to a novel process for separating mixtures of finely divided solids which represents a significant departure from known froth flotation and selective flocculation processes. This process overcomes many of the deficiencies of prior art froth flotation and selective flocculation separation processes and provides means for producing novel kaolin pigment products when applied to kaolin clay. The procedure utilizes selective flocculation of constituents in a previously dispersed aqueous mineral pulp, preferably a pulp dispersed with sodium metasilicate and sodium polyacrylate. The pulp is dispersed in the sense that the particles are not aggregated with each other. The dispersed pulp is preconditioned for subsequent selective flocculation by the addition of both a fatty acid and a water soluble source of a polyvalent metal cation. The quantities of fatty acid and polyvalent metal cation are insufficient to flocculate components in the dispersed pulp. When anionic polymer is added to the preconditioned dispersed pulp, a dense flocculated phase forms virtually instantaneously and settles rapidly as a dense, viscous, gelatinous bottom layer; the top layer is a dispersed fluid pulp containing the non-flocculated mineral particles. The flocculated phase also contains virtually all of the fatty acid and polyvalent cations introduced into the pulp. Separation of the lower dense gelatinous layer from the remainder of the pulp is readily accomplished by decantation or other conventional unit operation. The pulp is not subjected to froth flotation after introduction of fatty acid and polymer as it is in Woolery (supra); nor is froth flotation used to accomplish the separation of the lower flocculated phase from the upper dispersed phase.

The crude may either be treated with soda ash after being blunged with a blend of sodium metasilicate and sodium polyacrylate or the crude may be blunged with a three component blend of soda ash, sodium metasilicate and sodium polyacrylate. In either of the two cases, the soda ash must be added prior to the conditioning step. It may be noted that using soda ash in the process tends to give better brightness product.

Addition of soda ash to the pre-condition step alters the floc characteristics (flocs those form on the addition of the flocculant). Floc size has a significant effect on the process. Small and compact flocs are desired as they tend to entrain smaller amounts of the clay or the dispersed slurry thereby aiding in improving the recovery. Increasing the amount of soda ash leads to formation of much more compact flocs. On the other hand, the size of the flocs is controlled by the sodium polyacrylate dosage. However, addition of excess soda ash would tend to coagulate the clay thereby impacting the conditioning step. Also, soda ash is known to be a buffer, therefore its addition aids in controlling the dispersion, especially in a highly basic solution (rich in caustic/silicate solution). A high pH solution would negatively impact the floc characteristics for selective flocculation as it would over disperse the suspension.

In a preferred embodiment, the invention is practiced with impure kaolin clay containing discrete particles of at least one colored titaniferous impurities and the kaolin and the impurities are so fine that they do not respond satisfactorily to conventional froth flotation processes such as ULTRA-FLOTATION or TREP. The dispersant used in purifying such kaolins in accordance with the present invention is preferably sodium metasilicate supplemented with sodium polyacrylate and soda ash. Examples of such ultrafine kaolins are those mined in East Georgia, USA; such clays which have an average particles size below 0.5 micron and are presently beneficiated by selective flocculation using a weakly anionic polymer, followed by addition of copious quantities of salt to facilitate sedimentation of the flocs and multiple washing steps.

We believe the invention constitutes a significant breakthrough in the beneficiation of a host of very finely divided mineral mixtures that can provide a significant economic benefit over presently practiced technologies. For example, high brightness kaolin products (90% GE brightness and higher) can be produced without froth flotation. In some cases the high brightness kaolin products can be produced without conventional post processing procedures intended to increase brightness, such as, for example, bleaching and magnetic separation. This is explained by the fact that our process can achieve such a significant reduction in the quantity of colored impurities that conventional downstream beneficiation operations many not be needed to produce kaolin products of desired brightness. In some cases, preliminary degritting (necessary in most kaolin beneficiation schemes) can be omitted because the grit can be removed in the settled flocculated impurity layer. The process of invention does not introduce the undesirable soluble salts introduced during prior art selective flocculation processes. This can provide significant cost reduction in kaolin processing because multiple washing steps are not needed. In fact, the multivalent metal cations present in the kaolin crude or introduced during processing may be picked up substantially quantitatively in the flocculated layer, thus not impairing the rheology of the purified kaolin. Beneficiated kaolin products having remarkably good rheology can be produced.

DESCRIPTION OF PREFERRED EMBODIMENTS

The process is capable of removing titania (rutile and anatase and mixtures thereof) from kaolin even when the titania and the kaolin are in the form of very fine particles. The process is also capable of separating other non-sulfide minerals from other silicates. It may be employed to separate certain iron-bearing sulphides such as pyrite. The process of this invention can be employed to remove apatite (calcium phosphate) from silicate minerals in phosphate ores, ore concentrates and ore preconcentrates, even when the feed material is slimed. The process can be employed to concentrate slimed cassiterite (tin oxide), iron oxide, wollastonite, alkaline earth carbonates such as dolomite, calcite and magnesite from silicate gangue in ores, ore concentrates and ore preconcentrates. Naturally occurring zeolites, containing alkaline earth ions, such as chabazite, may be separated from silicate gangue. Exemplary of minerals present in various silicate gangue are feldspar, smectitic clay, fine silica, phosphatic clays and kaolins. The silicate materials remain in the dispersed phase during such separations. The process of the invention may also be used to concentrate ilmenite ores, nickel ores, anatase and bauxite. Generally, any mineral that can be collector coated for selective froth flotation by means of the combination of fatty acid with polyvalent cation promoter can be separated as a gelatinous flocced lower layer by the process of the invention.

The process is useful in separating minerals all or a significant portion of which are finer than 325 mesh. (U.S. Sieve). The grit, which is defined as +325 mesh (U.S. Sieve) particles, i.e., particles that are retained on a 325 mesh screen, can be eliminated from the feed prior to or during the process. The invention appears to have the most significant commercial value in separating ultrafine minerals, e.g., mineral mixtures in which at least 50% by weight of the particles are in the sub-micron size range. Application of the process to such finely mineralized mixtures represents the potential for the most significant cost reductions. This is explained by the fact that costly pre- or post-processing conventional steps such as bleaching and washing can be eliminated or they can be carried out more expeditiously.

The invention will be described in detail for processing impure ultrafine kaolin from East Georgia, USA. Colored impurities are predominantly titania (both rutile and anatase). Typical titania ($TiO_2$) analysis are in the range of 2.0 to 4.5% by weight, based on the dry weight of the degritted clay as mined. However, acceptable improvements in brightness have been achieved with East Georgia clay crudes in which $TiO_2$ analyzed as low as 0.6% to as high as 6.0%. A portion of the iron typically is located in the structural lattice of the kaolin crystals. Iron is present in minor amount, e.g., up to 1.0% $Fe_2O_3$ based on the dry weight of the degritted clay. These clays may have poor response to oxidative and reductive bleaches and do not respond satisfactorily to known flotation schemes.

The particle size of typical East Georgia crude clays varies from 80% finer than 2 micron to in excess of 95% finer than 2 micron e.s.d. (equivalent spherical diameter). At least 50% by weight is generally finer than 0.4 micron e.s.d. Thus, these clays fall within a common definition of slimed ores, as used in froth flotation technology.

The East Georgia clays are becoming of increasing importance to the paper industry due to excellent high shear rheology and as a compatible co-pigment with carbonates. Removal of titania impurities improves the brightness and the shade (less yellow) of the clay, resulting in a more compatible carbonate co-pigment.

The primary dispersant presently preferred in practice of the invention is sodium metasilicate. We have found that compositions obtained made by mixing sodium hydroxide with sodium silicate solutions such as N® Brand sodium silicate to the same $Na_2O/SiO_2$ ratio as sodium metasilicate do not result in as extensive $TiO_2$ removal from East Georgia kaolins as can be achieved using sodium metasilicate.

The sodium metasilicate primary dispersant can be added dry or as a solution in water. When added as a solution, the concentration of the metasilicate is not important. The primary dispersant is added to a clay of 5 percent to 70 percent solids, preferably above 50% solids, using 3 to 9 pounds per ton, preferably above 6 pounds per ton, sodium metasilicate, dry weight based on the dry clay weight. Sodium metasilicate, in excess amounts, will tend to coagulate the suspension; this has an adverse effect on the selective flocculation process. When added in insufficient amount, the slurry will not be dispersed; this adversely affects the selective adsorption of the flocculating agent.

A water soluble dispersant grade of sodium or ammonium polyacrylate such as C-211 sodium polyacrylate, is advantageously added to the pulp previously dispersed with sodium metasilicate, using 0.1 to 0.8 pounds per ton, based on the dry weight of the clay, in order to assure dispersion of the clay throughout processing. Typical molecular weights of polyacylate dispersants can range between 2,000 to 20,000. The acrylate dispersant is essential for achieving high recovery of purified clay. Recommended viscosity of an adequately dispersed slurry for purposes of this invention is less than 600 CPS at 20 rpm, as measured by a No. 2 spindle in a Brookfield viscometer. The pH of a kaolin pulp prior to addition of sodium metasilicate is usually in the range of 5 to 7. After addition of sodium metasilicate, the pH is usually in the range of 7 to 11; sodium or ammonium polyacrylate usually has no effect on the pH of the slurry.

After addition of primary dispersant and acrylate salt (secondary dispersant), the dispersed kaolin pulp is a thin fluid having the appearance of a milkshake. When maintained quiescent, essentially no stratification or appearance of flocs takes place. As mentioned, the slurry is dispersed in the sense that particles are not aggregated. The degree of dispersion may not be the same as that of a slurry dispersed to minimum viscosity (i.e., a rheologically dispersed slurry).

Pursuant to the instant invention, the treated pulp is treated with 1 to 10 pounds per ton of soda ash. All weights are expressed on a dry weight basis. The soda ash in the same range may be used at the primary dispersion stage in a blend form with either the sodium silicate or sodium polyacrylate dispersants or with both of these. Soda ash is added in dry or solution form. The original clay may effectively be blunged in fresh water or recycled mine water which is silicate rich, by using soda ash as a "buffering agent", see Example 4.

Fatty acids used in the process to precondition the impure clay (or other feed material) for selective flocculation can be of the type conventionally used in oxide mineral froth flotation, for example, C12–18 fatty acids. Oleic acid is presently preferred. Mixtures of fatty and resin acids such as tall oil fatty acids and sulfonated fatty acids can be used. The amount of fatty acid will vary with the content of impurities in the kaolin (or relative amount of nonsilicate minerals in other minerals that can be coated with oleic acid and polyvalent cations) and is typically in the range of 1 to 10 pounds, most usually 3 to 5 pounds per ton based on the dry clay weight. When too much fatty acid is used, a film (or a separate phase) is observed on the surface of the slurry; this film entraps fine colored aggregates, preventing them from settling after flocculation; when an insufficient amount of fatty acid is used, the separation efficiency of the process is poorer. Addition of frothers is not advantageous.

A salt containing a polyvalent metal cation is added to the pulp simultaneously with or before the addition of the fatty acid. When treating an ore, pre-concentrate or a concentrate containing a solid which provides polyvalent cations in pulp, it may not be necessary to add any other source of polyvalent cations. Suitable salts containing polyvalent metal cations are soluble in water at the pH of the pulp to which the salt is added. Especially preferred are salts containing divalent metal cations, particularly calcium, magnesium and barium. Other polyvalent metal cations that may be used include aluminum, ferric, tin, titanium, manganese and rare earth. When processing clays, colorless cations such as calcium and magnesium are recommended. The preferable anion of the salt is chloride, although nitrate, sulfate, acetate or formate salts may be used. The salt is added dry or as an aqueous solution; salt is added in the amount generally in the range of about 0 to 4 pounds/ton, most preferably about 2 pounds per ton of dry clay. When excess salt is used, undesired nonselective flocculation of the pulp may occur and this may interfere with the ability of the polymer to flocculate the titania selectively. Also excess salt (relative to fatty acid) may necessitate one or more washing steps which can add significantly to the cost of the processing. When no salt is added, the flocs formed are very small and this would adversely affect the separation process.

The flocculating agent used in the process is highly anionic and is a homopolymer or co-polymer of vinyl acrylic acid, carboxylic anhydride and carboxylic acid salt monomer with a suitable non-ionic monomer. Examples of a non-ionic monomers are acrylic carboxylic acid amide and carboxyl alkyl esters. A co-polymer of acrylic acid (or salt thereof) and acrylamide is preferred for kaolin processing. Since the polymer is highly anionic, it consists predominately of the acid acrylic group.

A flocculating agent used successfully in the process is a highly anionic, high molecular weight copolymer of sodium acrylate and acrylamide having greater than 50% (by weight) acrylate and a molecular weight in excess of 5 million. The preferred polymer has 95% or greater acrylate (by weight) in the co-polymer and a molecular weight in the range of 10–30 million, with 25 million preferred. Polymers used in the accompanying examples were obtained from Sharpe Specialty Chemical Co. and included Sharpfloc™ 9990, 9993, 9950, 9954 and 8581. The method of production of these polymers is proprietary. In theory they can be prepared by either copolymerization of acrylamide and acrylic acid (anionic monomer) or by partial hydrolysis of polyacrylamide.

Fatty acid and salt are usually added to a previously dispersed pulp at 10 to 50 percent solids. Minimal dilution occurs when these reagents are added, whereby the solids of the pulp remain essentially unchanged. The pH of the slurry typically ranges from 6.5 to 10 after addition of fatty acid and salt.

The solids of the pulp after addition of fatty acid and salt is generally in the range of 20 to 45, with about 40% preferred. It is desirable to dilute the pulp with water, preferably water having a low mineral content, after addition of fatty acid and salt but prior to addition of the polymer.

The polymer is added as a solution having a concentration (weight) less than 0.5%. At higher concentration, the flocculated material may aggregate due to mixing limitations. At very low concentrations, the volume of water added becomes too large, thereby causing handling problems. In making up the polymer solution, water with a low content of calcium and magnesium must be used. Agitation should be sufficiently moderate to avoid degradation of the polymer while it is being solubilize in water.

Virtually immediately after the polymer solution is added to the well dispersed pulp preconditioned with fatty acid and metal salt, the formation of flocs can be observed. It is not necessary to agitate the contents of the vessel in order for floc to form. However, agitation, even severe, will not impair floc formation. Within a few minutes of standing under quiescent or semi-quiescent conditions, the floc settles as a well-defined viscous gelatinous bottom layer which contains predominantly all of the titaniferous minerals in the starting clay. In case of East Georgia kaolin, the iron content of the clay remains essentially unchanged. However, in the case of kaolins containing liberated iron mineral, the iron should concentrate in the flocs. Unless the clay has been degritted before treatment, grit will report in the flocced layer when processing kaolin crude. The lower settled layer is generally dun colored and is distinctly darker than the dispersed upper layer which contains the purified clay. Most of the water in the pulp appears in the supernatant clay-rich upper layer.

After polymer addition, a fluid dispersion of beneficiated kaolin product can be decanted in a cylindrical tank, column, etc., with the underflow containing the gelatinous mass containing coarse particles greater than 5 micron, impurities including color bodies, and other minerals. Mechanical devices such as a drag box or a low shear centrifugal device, may also be used to separate the gelatinous flocs from the dispersed product.

Processing downstream of decantation can provide numerous opportunities to optimize the overall process yield and decrease the amount of residual impurities which remain in the dispersed phase. This will have an impact on the quality of the beneficiated product and the overall cost to manufacture such a product.

Very small (even colloidal) flocs may remain in suspension in the dispersed beneficiated kaolin product due to the high viscosity imparted to the kaolin slurry by the addition of the flocculating agent. These flocs are structures which contain impurities and fatty acid and are incapable of settling after the initial polymer addition. These small flocs can be dispersed by the addition of an appropriate dispersant such as C-211 (sodium polyacrylate).

An alternative method to deal with the small amount of flocs is to retain the small flocs on a screen when operating in a batch mode. Blinding of the screen can be a significant processing problem when operating this type of a process in a continuous manner without frequent washing of the screen surface with an agent capable of dislodging the flocs. This agent could be high pressure water or a solvent.

Additional improvement in the purity, physical properties and brightness of the beneficiated kaolin product may be achieved with a HGMS (high gradient magnetic separator) having a field strength above 2 tesla, preferably up to 5 tesla. Also, impurities located in the pore structure of the mineral may be removed with a process step of "scrub grinding" upstream of the HGMS. This unit operation does not subject the pulp to significant changes in particle size distribution. This process will provide a liberation of embedded impurities not removed by the initial implementation of the process of this invention.

Additional brightness enhancement may be achieved using a conventional reduction bleach. A dithionite chemical agent can be used or the reagent can be formed in situ and described in U.S. Pat. No. 5,145,814, Willis, et al. Oxidation bleaches can be of benefit when treating a clay contaminated with organic impurities.

The process of the invention can be employed to reduce further the level of colored impurities in kaolin materials that have already undergone partial purification by means such as, for example, froth flotation.

In laboratory experimentation simple propeller mixers can be employed during all stages of the processing. Batch or continuous operations may be employed. In continuous operations, a squirrel cage mixer can be used to mix the dispersed pulp after addition of fatty acid and salt.

The following examples are given to illustrate the invention in presently preferred best mode operation and are not to be construed as limiting the invention thereto. In Examples 1 to 5, the kaolin crudes employed was from a mine in East Georgia, USA. The typical particle Size distribution was 80% (weight) finer than 2 microns with average particle size being 0.3 to 0.4 microns.

All quantities are reported on a dry weight basis unless otherwise indicated. All mesh sizes refer to values obtained using U.S. Sieves.

EXAMPLE 1

In accordance with the teachings of U.S. Ser. No. 08/350,913, East Georgia kaolin crude was blunged at 60% solids with 7 lb/ton of anhydrous sodium metasilicate and 0.6 lb/ton of C-211 (sodium polyacrylate) using a Cowles mixer. This slurry was mixed for 15 minutes to ensure complete makedown of the crude clay. This slurry was screened through a 325 mesh screen to remove the coarse grit material. The resulting slurry was then diluted to 40% solids. The pH of the slurry was 10.4. To this slurry 5 lb/ton of oleic acid and 2 lb/ton of calcium chloride solution (38.5%) were added simultaneously while mixing the slurry. The resulting slurry was mixed thoroughly at ambient temperatures for 15 minutes. To this slurry 0.25 lb/ton of Sharpfloc™ 9950 polymer was added under mild agitation. Sharpfloc™ 9950 is a co-polymer of polyacrylamide and polyacrylate with 95% anionic charge and molecular weight in excess of 10 million. The required amount of polymer was diluted to a concentration such that when added to the clay slurry the resulting solids loading was 20%. Colored flocs began to appear immediately. As soon as agitation was stopped the flocs began to settle very rapidly. The flocs were settled for 30 minutes. The floc phase (dun colored gelatinous phase) constituted about 30% of the volume of the slurry. The dispersed slurry was decanted to separate it from the flocced layer and passed through a 325 mesh screen to remove any small flocs still remaining with the slurry of purified kaolin. The solids content of the decanted slurry was 10%. The slurry was then flocced, using alum and sulfuric acid, and filtered in a Buchner funnel. The filter cake was dried in a microwave oven.

The results show that the $TiO_2$ level of the East Georgia kaolin was reduced from about 4% to about 0.6%. The GE brightness improved from 80.0% to 90.4% at an outstanding clay recovery of 73%.

EXAMPLE 2

In accordance with U.S. Ser. No. 08/350,913, East Georgia kaolin crude was blunged at 60% solids with 5 lb/ton of anhydrous sodium metasilicate and 0.5 lb/ton of C-211 (sodium polyacrylate) using a Cowles mixer. This slurry was mixed for 15 minutes to ensure complete makedown of the crude clay. This slurry was screened through a 325 mesh screen to remove the coarse grit material. The resulting slurry was then diluted to 40% solids. To this slurry 2 lb/ton of calcium chloride solution (38.5%) followed by 3 lb/ton of oleic acid was added. The resulting slurry was mixed thoroughly at ambient temperatures for 15 minutes. To this slurry 0.33 lb/ton of Sharpfloc™ 9950 polymer was added under mild agitation. Sharpfloc™ 9950 is a co-polymer of polyacrylamide and polyacrylate with 95% anionic charge and molecular weight in excess of 10 million. The required amount of polymer was diluted to a concentration such that when added to the clay slurry the resulting solids loading was 20.%. Colored flocs began to appear immediately. As soon as agitation was stopped the flocs began to settle very rapidly. The flocs were settled for 30 minutes. The floc phase (dun colored gelatinous phase) constituted about 30% of the volume of the slurry. The dispersed slurry was decanted to separate it from the flocced layer. The solids content of the decanted slurry was roughly 10%. The slurry was then flocced, using alum and sulfuric acid, and filtered in a Buchner funnel. The filter cake was dried in a microwave oven.

The GE brightness of the product was 89.1% and the recovery was 49.1%.

EXAMPLE 3

In accordance with the present invention, East Georgia kaolin crude was blunged at 60% solids with 5 lb/ton of anhydrous sodium metasilicate and 0.5 lb/ton of C-211 (sodium polyacrylate) using a Cowles mixer. This slurry was mixed for 15 minutes to ensure complete makedown of the crude clay. This slurry was screened through a 325 mesh screen to remove the coarse grit material. The resulting slurry was then diluted to 40% solids. This slurry was further treated with 5 lb/ton of soda ash. The rest of the processing was similar to that of Example 2. On addition of the flocculent, colored flocs began to appear immediately. As soon as agitation was stopped the flocs began to settle very rapidly. The flocs were settled for 30 minutes. The floc phase (dun colored gelatinous phase) constituted about 30% of the volume of the slurry. The dispersed slurry was decanted to separate it from the flocced layer. The solids content of the decanted slurry was roughly 10%. The slurry was then flocced, using alum and sulfuric acid, and filtered in a Buchner funnel. The filter cake was dried in a microwave oven.

A comparison of the results of Example 2 . with the present invention (addition of soda ash), shows that the brightness improved from 89.1% to 91.6% at comparable recovery of 51.7%. This increase in brightness is of significant economic benefit.

EXAMPLE 4

In accordance with the present invention, East Georgia kaolin crude was blunged at 60% solids with 5 lb/ton of anhydrous sodium metasilicate and 0.5 lb/ton of C-211 (sodium polyacrylate) in recycled white water using a Cowles mixer. The recycled white water is the waste water in the mine which comprised very fine clay and some original dispersant, i.e., sodium silicate (N® brand). It is often referred to as "chalky" water in the trade. This slurry was mixed for 15 minutes to ensure complete makedown of the crude clay. This slurry was screened through a 325 mesh screen to remove the coarse grit material. The resulting slurry was then diluted to 40% solids. This slurry was treated with varying amounts of soda ash (0,2.0,3.0,3.5,3.7,4.0,5.0 lb/ton). To this slurry 1.3 lb/ton of calcium chloride solution (38.5%) followed by 5 lb/ton of oleic acid was added. The rest of the processing was similar to that of Example 2. On addition of the flocculent, colored flocs began to appear immediately. As soon as agitation was stopped the flocs began to settle very rapidly in case of slurries treated with 2.0 lb/ton or greater soda ash. The flocs were settled for 30 minutes. The dispersed slurry was decanted to separate it from the flocced layer. The dispersed slurry was then flocced, using alum and sulfuric acid, and filtered in a Buchner funnel. The filter cake was dried in a microwave oven.

In the test in which no soda ash treatment was carried out, very fine flocs were observed which did not settle in 30 minutes. Therefore, recovery of the product was very poor. However, on increasing the amount of soda ash, larger flocs were observed and better separation could be achieved, thereby yielding a higher brightness and recovery values. The results in Table 1 show that the separation efficiency increased as the amount of soda ash in the system improved.

TABLE 1

Effect of Soda Ash Dispersant on separation
Efficiency of the Selective Flocculation Process

| Amount of Soda Ash #/ton of dry clay | % GEB | wt. % Recovery | % TiO2 wt % in product |
|---|---|---|---|
| 0 | 90.0 | 13.1 | 0.63 |
| 2.0 | 87.5 | 60.0 | 1.06 |
| 3.0 | 88.2 | 61.7 | 0.81 |
| 3.5 | 88.7 | 61.1 | 0.64 |
| 3.7 | 88.9 | 57.0 | 0.68 |
| 4.0 | 89.9 | 55.7 | 0.45 |
| 5.0 | 90.2 | 46.7 | 0.45 |

EXAMPLE 5

Example 5 shows the effect of treating the pre-dispersed slurry with soda ash as compared to adding it to the sodium metasilicate/sodium polyacrylate mixture at the primary dispersion site. The latter is preferred due to ease in production.

EXAMPLE 5A

In accordance with the invention, East Georgia kaolin crude was blunged at 60% solids with 5 lb/ton of anhydrous sodium metasilicate and 0.5 lb/ton of C-211 (sodium polyacrylate) in recycled white water using a Cowles mixer. This slurry was mixed for 15 minutes to ensure complete makedown of the crude clay. This slurry was screened through a 325 mesh screen to remove the coarse grit material. The resulting slurry was then diluted to 40% solids. This slurry was treated with 5.0 lb/ton soda ash. The rest of the processing was similar to that of Example 2. On addition of the flocculent, colored flocs began to appear immediately. As soon as agitation was stopped the flocs began to settle very rapidly. The flocs were settled for 30 minutes. The dispersed slurry was decanted to separate it from the flocced layer. The dispersed slurry was then flocced, using alum and sulfuric acid, and filtered in a Buchner funnel. The filter cake was dried in a microwave oven.

The resulting product had a brightness of 91.5% with a recovery of 52.7%.

EXAMPLE 5B

Example 5A was repeated with soda ash being added as the third component (together with the sodium metasilicate and polyacrylate dispersant). The rest of the test procedure was similar to the process in Example 5A. The resulting product had a brightness of 91.6% and a recovery value of 38.8%. These results indicate that using the three component dispersant blend did not affect the brightness. However, smaller flocs were observed and it did have a significant impact on the recovery.

EXAMPLE 6

Example 6 illustrates the especially preferred method of soda ash pre-treatment to optimally beneficiate a slurry that had been aged for too long a period to effect the desired purification.

East Georgia kaolin crude was blunged at roughly 60% solids with 5 lb/ton of anhydrous sodium metasilicate and 0.5 lb/ton of C-211 (sodium polyacrylate) to a pH of 9.3 in a plant blunger. The dispersed slurry was degritted by settling in drag boxes. The resulting slurry was diluted to about 40% solids. This slurry was aged for over a month. During the aging process the pH of the slurry drifted to below 8.0. More dispersant was added to maintain the pH of 9.2.

This slurry was conditioned at the same conditions used in Example 2. On addition of the polymer the entire slurry flocced and there was no settling. The entire sample turned into a viscous mass.

However when treating a portion of the aged slurry with 5 lb/ton of soda ash prior to conditioning with calcium chloride and oleic acid as in Example 2, the slurry responded to the flocculent addition. On addition of the flocculent, colored flocs began to appear immediately. As soon as agitation was stopped the flocs began to settle very rapidly. The flocs were settled for 30 minutes. The dispersed slurry was decanted to separate it from the flocced layer. The dispersed slurry was then flocced, using alum and sulfuric acid, and filtered in a Buchner funnel. The filter cake was dried in a microwave oven. The brightness of the product was 91.0% and the recovery was 50%.

We claim:

1. A method for the selective separation of finely divided mineral particles in a mixture of mineral particles which comprises:
   a) forming said mixture into a dispersed aqueous pulp, using sodium silicate and sodium polyacrylate as dispersants;
   b) adding to said dispersed aqueous pulp a fatty acid and a source of polyvalent cations, unless at least one of the minerals in the pulp provides a source of polyvalent cations, without flocculating said pulp;
   c) without adding a frothing agent to said pulp, incorporating a high molecular weight organic anionic polymer, thereby forming flocs which settle as a dense lower layer;
   d) and separating said settled layer from the remainder of the pulp, the improvement which comprises adding soda ash as a dispersant after step (a) and before step (c).

2. The process of claim 1 wherein said finely divided mineral particles comprises kaolin clay and soda ash is used in amounts in the range of 1 to 10 pounds per ton of dry kaolin clay.

3. The process of claim 2 wherein said flocs comprise colored titania.

4. The process of claim 2 wherein at least 50% by weight of mineral particles in said pulp are in the sub-micron size range.

5. The process of claim 2 wherein said sodium silicate dispersant in step (a) is sodium metasilicate.

6. The process of claim 1 wherein sodium polyacrylate dispersant is added to the dispersed pulp from step (d).

7. The process of claim 1 wherein said fatty acid is oleic acid.

8. The process of claim 1 wherein said source of polyvalent cations is calcium chloride.

9. The process of claim 1 wherein said pulp is diluted after step (b) and before step (c).

10. The process of claim 1 wherein said polymer is highly anionic polyacrylamide or a co-polymer of acrylamide.

11. The process of claim 10 wherein the molecular weight of said polymer exceeds 5 million.

12. The process of claim 1 wherein said mixture comprises kaolin clay and a titania impurity, said dispersants comprise sodium metasilicate and sodium polyacrylate, said fatty acid is oleic acid, said source of polyvalent cations is calcium chloride and said anionic polymer is polyacrylamide.

13. The process of claim 12 wherein in relation to the dry weight of said kaolin clay, said sodium metasilicate is used in amount of about 5–10 lb/ton, said sodium polyacrylate is used in amount of about 0.5–1.01 lb/ton, said oleic acid is used in amount of about 2–8 lb/ton, said calcium chloride is used in amount of about 1–5 lb/ton and said anionic polymer is used in amount of about 0.1 to 1 lb/ton.

14. The process of claim 12 wherein said pulp in step (a) is at about 60% solids and is diluted before step (b) to about 40% solids and is further diluted before step (c) to about 20% solids.

15. A method for the selective separation of finely divided mineral particles from a finely mineralized East Georgia kaolin crude clay containing particles of a colored titania impurity which comprises:
   a) forming said crude clay into a dispersed aqueous pulp by adding sodium metasilicate and sodium polyacrylate;
   b) adding soda ash in amounts of 1 to 7 pounds per ton of said kaolin crude clay;
   c) adding oleic acid and calcium chloride to said dispersed pulp without flocculating said pulp;
   d) without adding a frothing agent to said pulp, incorporating a high charge density anionic polyacrylamide, thereby forming flocs which settle as a dense lower gelatinous layer;

e) and separating said settled dense lower layer from the remainder of the pulp which is a dispersion of purified kaolin.

16. The process of claim 15 a wherein sodium polyacrylate dispersant is added to the dispersion of purified kaolin from step (e).

17. The process of claim 15 wherein said pulp in step (a) is aged prior to adding soda ash in step (b).

18. The process of claim 15 wherein the pulp formed in step (a) is obtained by blunging said crude kaolin clay in recycled white water containing sodium silicate.

* * * * *